(12) United States Patent
Bisa et al.

(10) Patent No.: US 11,099,922 B2
(45) Date of Patent: Aug. 24, 2021

(54) SYSTEM AND METHOD FOR ISOLATING A FAILED CARD

(71) Applicant: DELL PRODUCTS, LP, Round Rock, TX (US)

(72) Inventors: Rama Rao Bisa, Bangalore (IN); Johan Rahardjo, Austin, TX (US); Pavan Kumar Gavvala, Bangalore (IN); Elie Antoun Jreij, Pflugerville, TX (US); Akkiah Choudary Maddukuri, Austin, TX (US); Isaac Qin Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 115 days.

(21) Appl. No.: 16/538,188

(22) Filed: Aug. 12, 2019

(65) Prior Publication Data

US 2021/0049059 A1    Feb. 18, 2021

(51) Int. Cl.
| G06F 11/00 | (2006.01) |
| G06F 11/07 | (2006.01) |
| G06F 1/24 | (2006.01) |
| G06F 13/10 | (2006.01) |
| G06F 1/26 | (2006.01) |

(52) U.S. Cl.
CPC .............. *G06F 11/079* (2013.01); *G06F 1/24* (2013.01); *G06F 1/266* (2013.01); *G06F 11/0745* (2013.01); *G06F 11/0751* (2013.01); *G06F 11/0793* (2013.01); *G06F 13/102* (2013.01)

(58) Field of Classification Search
CPC .. G06F 11/008; G06F 11/079; G06F 11/3409; G06F 11/3452; G06F 11/3604
USPC ....................................................... 714/1–57
See application file for complete search history.

(56) References Cited

U.S. PATENT DOCUMENTS

| 9,424,148 | B2 | 8/2016 | Brundridge et al. | |
| 9,734,015 | B2 | 8/2017 | Herzi et al. | |
| 2005/0276092 | A1* | 12/2005 | Hansen | G06F 3/0664 365/149 |
| 2011/0087910 | A1* | 4/2011 | Lambert | G06F 1/32 713/323 |
| 2012/0079326 | A1* | 3/2012 | Riegel | G06F 11/008 714/38.1 |
| 2014/0207902 | A1* | 7/2014 | Joshi | G06F 9/00 709/217 |

(Continued)

*Primary Examiner* — Sarai E Butler
(74) *Attorney, Agent, or Firm* — Larson Newman, LLP

(57) ABSTRACT

An information handling system includes a device and a baseboard management controller. The device is configured to communicate with a processor of the information handling system. The baseboard management controller is configured to communicate with the device via an in-band communication channel. The baseboard management controller determines whether data is received from the device via an in-band communication channel, and determines whether the baseboard management controller may communicate with the device via an out-of-band communication channel. In response to the data not being received and the baseboard management controller not able to communicate with the device, the baseboard management controller detects a failure of the device. In response to the detection of the failure of the device, the baseboard management controller isolates the device.

20 Claims, 6 Drawing Sheets

(56) References Cited

U.S. PATENT DOCUMENTS

| | | | |
|---|---|---|---|
| 2016/0037686 A1* | 2/2016 | Shabbir | H05K 7/20727 |
| | | | 700/300 |
| 2016/0274629 A1* | 9/2016 | Lovicott | G06F 1/206 |
| 2018/0203779 A1* | 7/2018 | Huang | G06F 13/4282 |
| 2018/0275904 A1* | 9/2018 | Valentino | G06F 3/0679 |
| 2020/0401112 A1* | 12/2020 | York | G06F 1/20 |

* cited by examiner

SYSTEM AND METHOD FOR ISOLATING A FAILED CARD

FIELD OF THE DISCLOSURE

The present disclosure generally relates to information handling systems, and more particularly relates to a system to isolate a failed card.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a device and a baseboard management controller. The device is configured to communicate with a processor of the information handling system. The baseboard management controller is configured to communicate with the device via an in-band communication channel. The baseboard management controller may determine whether data is received from the device via an in-band communication channel, and determine whether the baseboard management controller may communicate with the device via an out-of-band communication channel. In response to the data not being received and the baseboard management controller not able to communicate with the device, the baseboard management controller may detect a failure of the device. In response to the detection of the failure of the device, the baseboard management controller may isolate the device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols indifferent drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
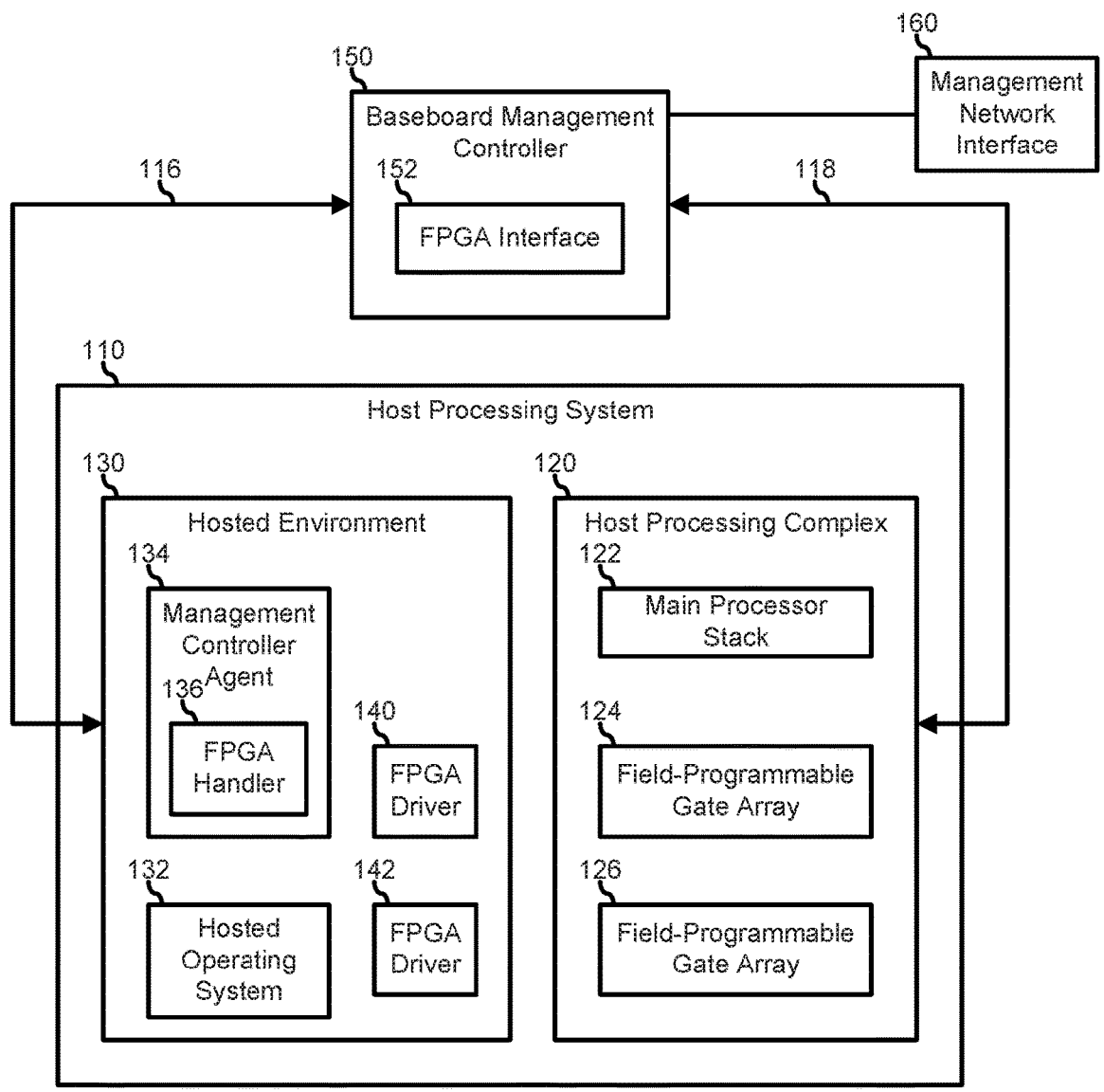
FIG. 1 is a block diagram of an information handling system according to an embodiment of the present disclosure.

FIG. 1 illustrates an information handling system 100 including a host processing system 110, a baseboard management controller (BMC) 150, and a management network interface 160. Host processing system 110 includes a host processing complex 120 and a hosted environment 130. Host processing complex 120 represents the main processing elements of information handling system 100, including a main processor stack 122, and field-programmable gate arrays (FPGAs) 124 and 126. Main processor stack 122 represents hardware including one or more processors, chipset elements, storage devices, memory devices, I/O devices, and the like. FPGAs 124 and 126 represent processing resources of host processing complex 120 that can be utilized to offload main processor stack 122 from various functions as needed or desired.

Hosted environment 130 includes a hosted OS 132, a BMC agent 134, and FPGA drivers 140 and 142. Hosted environment 130 represents a processing environment instantiated in code on host processing complex 120, and can include a BIOS or UEFI for information handling system 100, other firmware, device drivers, and the like, that establish the core operating code for establishing the hosted environment, and to launch hosted OS 132 on the host processing complex. Hosted OS 132 operates to manage the runtime aspects of hosted environment 130, to launch programs and applications on host processing complex 120, and to launch, manage, maintain, and halt tasks on FPGAs 124 and 126. FPGA drivers 140 and 142 operate to control FPGAs 124 and 126, and to provide an interface to enable hosted OS 132 and other components of hosted environment 130 to access the FPGAs. In a particular embodiment, one or more of FPGAs 124 and 126 include vendor specific functions and features for configuring, monitoring, and controlling the FPGAs. Such vendor specific functions and features are accessible to hosted environment 130 via FPGA drivers 140 and 142.

BMC 150 is connected via an interface 116 to interact with various functions and features of hosted environment 130, and is connected via an out-of-band interface 118 to interact with various functions and features of host processing complex 120. In particular, BMC 150 interacts with the various functions and features of hosted environment 130 via a management system agent 134 that is instantiated in the hosted environment to permit a user connected to the BMC to obtain status information from the pre-boot and runtime elements of the hosted environment, including the programs and applications instantiated in the hosted environment. The user can also provide commands and otherwise control the operations of the programs and applications, including directing hosted OS 132 to launch a program, application, or task, to modify the runtime operation of a program, application, or task, and to halt the execution of a program, application, or task, as needed or desired. Interface 116 represents a communication path between hosted environment 130 and BMC 150, as is known in the art, and can include a keyboard controller style (KCS) interface, a USB-NIC interface, an OS-to-BMC pass-through interface, or the like.

BMC 150 includes an FPGA interface module 152 that interacts with the various in-band functions and features of FPGA drivers 140 and 142 via an FPGA handler module 136 of management system agent 134 to permit the user to obtain status information from the tasks instantiated on FPGAs 124 and 126, and to access the in-band monitoring features of the FPGAs. FPGA interface module 152, interacting with FPGA handler module 136 also permits the user to provide commands and otherwise control the operations of FPGAs 124 and 126 or to manage the tasks running on the FPGAs, including directing hosted OS 132 to launch a task, to modify the runtime operation of a task, and to halt the execution of a task, as needed or desired.

BMC 150 also interacts out-of-band with the various functions and features of host processing complex 120. In particular, FPGA interface module 152 interacts out-of-band with FPGAs 124 and 126. For example, FPGA interface module 152 can receive out-of-band status information from FPGAs 124 and 126. Note that the status information that is available from FPGAs 124 and 126 via out-of-band interface 118 may be the same as, or different from the status information that is available from FPGA drivers 140 and 142, as may be determined by the particular FPGA vendor, or as otherwise dictated by design related choices, as needed or desired.

FPGA interface module 152 provides a management interface that permits a user that is connected to BMC 150 via management network interface 160 to select one or more of FPGAs 124 and 126, and to view the current operating status of the selected FPGA, such as by identifying the tasks currently being run on the selected FPGA, or the like, or by otherwise displaying information related to the status of the selected FPGA. Here, FPGA interface module 152 directs FPGA handler module 136 to retrieve the requested information from hosted environment 130, from hosted OS 132, or directly retrieves the requested information from the selected one of FPGAs 124 and 126 via out-of-band interface 118. FPGA interface module 152 then provides the retrieved information to the user.

Figure 2:
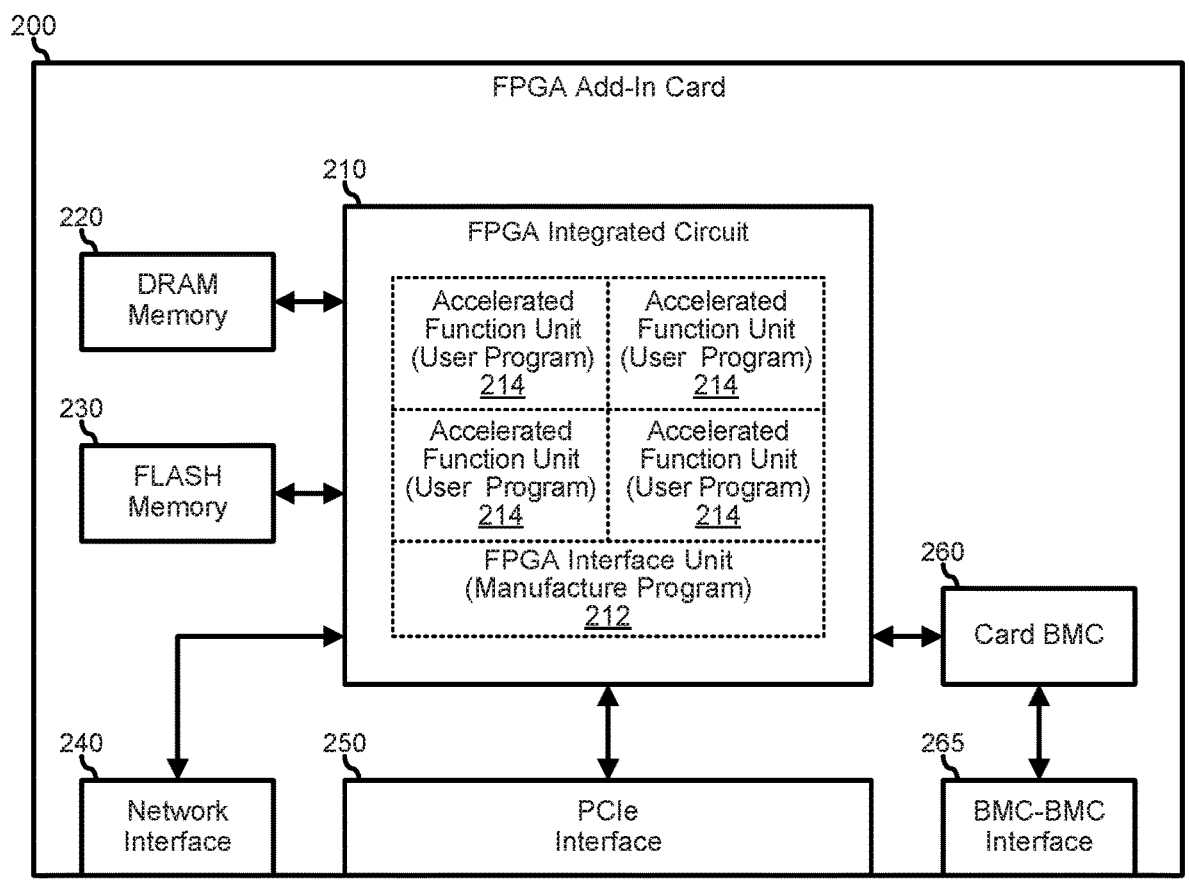
FIG. 2 is a block diagram detailing application and software level components of the information handling system of FIG. 1.

FPGAs are increasingly being utilized as high-performance accelerators in various server applications, where a typical server may employ one or more FPGAs. FIG. 2 illustrates an FPGA add-in card 200 that can be plugged into a communication interface of a server system. FPGA add-in card 200 includes an FPGA integrated circuit 210, one or more Dynamic Random Access Memory (DRAM) device 220, one or more FLASH memory device 230, a network interface 240, a PCIe interface 250, a card BMC 260, and a BMC-to-BMC interface 265. FPGA add-in card 200 provides the functions and features of an FPGA, but packaged so as to be easily incorporated into the architecture of an information handling system. FPGA integrated circuit 210 represents an FPGA device that is configured to provide hardware acceleration for various types of processing task and that is flexible to be configured to perform its intended processing tasks.

DRAM memory device 220 represents a volatile memory device that is accessible for storage of data to be consumed by, or produced by FPGA integrated circuit 210 or other functions of FPGA add-in card 200. Flash memory device 230 represents a non-volatile memory device for storing firmware for FPGA add-in card 200 and for storing other configuration information related to the FPGA add-in card. Network interface 240 represents a port for connecting to a network external to the information handling system into which FPGA add-in card 200 is installed. An example includes an Ethernet network, a Fibre Channel network, or another network, as needed or desired. In a particular embodiment, network interface 240 represents one or more Quad Small Form-Factor Pluggable (QSFP) modules. PCIe interface 250 represents a high-speed serial data interface in accordance with a PCIe specification. An example of PCIe interface 250 includes a four-lane (×4) link, an eight-lane (×8) link, a 16-lane (×16) link, or a link with another number of lanes as needed or desired. PCIe interface 250 represent a main data communication link between FPGA add-in card 200 and the information handling system into which the FPGA add-in card is installed for interacting with the programs and software instantiated in an operating system of the information handling system to perform the processing tasks as described below. Card BMC 260 represents a processor or controller of FPGA add-in card 200 for the monitoring, management, and maintenance of the functions and features of the FPGA add-in card. Card BMC 260 can operate in accordance with an Intelligent Platform Management Interface (IPMI) to provide the monitoring, managing, and maintaining of the functions and features out-of-band from an operating system instantiated on an information handling system into which FPGA add-in card 200 is installed. Here, card BMC 260 will typically be part of a management network of the information handling system that includes a BMC for the information handling system. Hence card BMC 260 will be connected to the system BMC via BMC-to-BMC interface 265. Thus BMC-to-BMC interface 265 operate to couple card BMC 260 to a management network of the information handling system for out-of-band communication between the card BMC and the elements of the information handling system. Examples of a management network interface may include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on the information handling system, that is apart from the execution of code by processors of the information handling system and procedures that are implemented on the information handling system in response to the executed code.

FPGA integrated circuit 210 executes FPGA Interface Unit (FIU) program 212, which is provided by the manufacturer of the FPGA integrated circuit of FPGA add-in card 200 and one or more Accelerated Function Unit (AFU) 214, which is provided by a user of the information handling system into which FPGA add-in card 200 is installed. The FIU 212; also referred to as the "Blue Bit Stream" where FPGA add-in card 200 represents an FPGA add-in card manufactured by Intel Corp.; provides a platform interface layer between FPGA integrated circuit 210 and the other interfaces of FPGA add-in card 200, such as DRAM device 220, FLASH memory device 230, network interface 240, PCIe interface 250, and card BMC 260. The AFUs, also referred to as the "Green Bit Streams" where FPGA add-in card 200 represents an FPGA add-in card manufactured by Intel Corp., provide the user intellectual property (IP) that uniquely programs FPGA integrated circuit 210 to perform the intended processing tasks. The FIU 212 is pre-configured at the time of manufacture, and, with the exception of periodic firmware updates from the manufacturer of FPGA add-in card 200, is intended to stay unchanged during the life of the FPGA add-in card. On the other hand, the AFUs 214 are meant to be programmed in accordance with the desired processing task to be performed by FPGA add-in card 200. Hence FPGAs are referred to as being "field programmable." In this regard, the AFUs 214 may be programmed to FPGA during a system boot process of the information handling system into which FPGA add-in card 200 is installed, or during run time on an operating system instantiated on the information handling system, and FPGA integrated circuit 210 can be reprogrammed with different AFUs as needed or desired during the run time.

Figure 3:
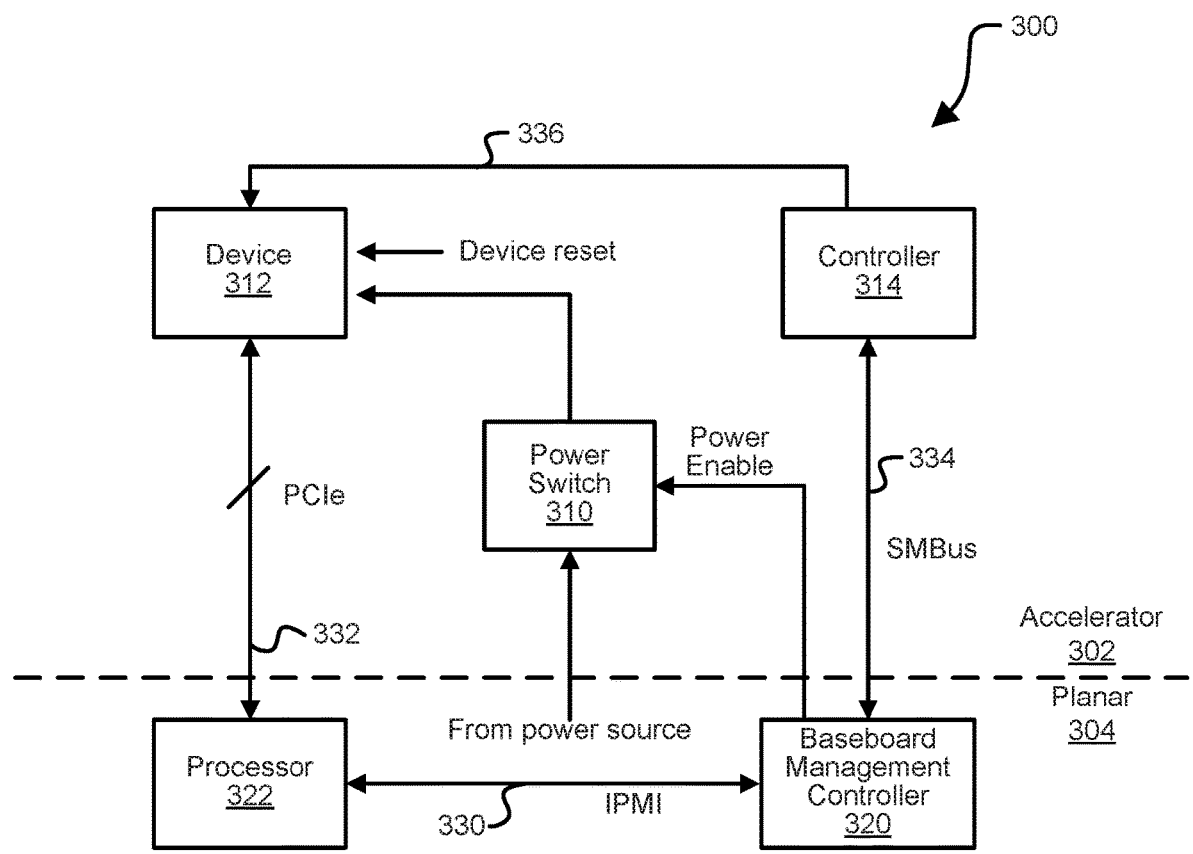
FIG. 3 is a block diagram of a portion of an information handling system according to at least one embodiment of the disclosure.

FIG. 3 shows a portion of an information handling system 300 including a riser portion 302 and a planar portion 304. Within riser portion 302, information handling system 300 includes a power switch 310, a device 312, and a controller 314. Within planar portion 304, information handling system 300 includes a baseboard management controller (BMC) 320 and a processor 322. In an example, device 312 may be any suitable device type using any suitable communication protocol including, but not limited to, a PCIe device, an FPGA device, a Gen-Z device, an OpenCAPI device, and cache coherent interconnect for accelerators (CCIX) device. For example, device 312 may be FPGA 124 or 126 of FIG. 1 or FPGA add-in card 200 of FIG. 2. In an example, controller 314 may be any suitable type of controller, such as a microcontroller, or card BMC 260 of FIG. 2. In an example, BMC 320 may be any suitable type of controller, such as a BMC in accordance with an IPMI specification, an Integrated Dell Remote Access Controller (iDRAC), or the like. In an example, power switch 310 may reside on planar portion 304 instead of accelerator portion 302 without varying from the scope of the disclosure. Information handling system 100 may include additional components (not shown in FIG. 1), without varying from the scope of this disclosure.

In an example, BMC 320 may execute software to enable the BMC to communicate with device 312. In an embodiment, the software is an iDRAC Service Module (iSM), which is a software service that integrates OS features of processor 322 with BMC 320. In an example, the iSM may provide OS-related information to BMC 320 and add capabilities such as Life Cycle (LC) log event replication into the OS log, WMI support (including storage), iDRAC SNMP alerts via OS, iDRAC hard reset and remote full Power Cycle. In certain examples, the iSM may have very little impact on processor 322 and smaller memory footprint than 'in-band' agents.

During operation, power switch 310 may receive power from a power source of information handling system 300, and may provide power to device 312. BMC 320 may receive data about device 312, via the OS of processor 322, over an in-band communication channel, such as communication channels 330 and 332. In an example, communication channel 330 may be any suitable communication channel, such as an IPMI communication channel, and communication channel 332 may be any suitable communication channel, such as a PCIe communication channel. In an embodiment, the data received from device 312 is health and statistics data about the device. In an example, the OS of processor 322 may continuously retrieve the data via communication channel 332 and periodically provide the data from device 312 to BMC 320.

In certain examples, BMC 320 may communicate with device 312, via controller 314, over an out-of-band communication channel. In an example, the out-of-band communication channel may include communication channels 334 and 336. In certain examples, the out-of-band communication between BMC 320 and device 312 may enable the BMC to monitor the device. For example, BMC 320 may monitor the temperature of device 312 via the out-of-band communication channel.

Based on the temperature of device 312 and the data received via processor 322, BMC 320 may control cooling fans within information handling system 300 to cool the device. However, if device 312 fails, BMC 320 may not receive the data via the in-band communication channel, may not be able to read the temperature of device 312 via the out-of-band communication channel, and device 312 may consume a maximum amount of power. In this situation, BMC 320 may provide a control signal to the cooling fans to cause the cooling fans to run at 100% to cool device 312, and the cooling fans may also consume a high amount of power. Thus, in an embodiment, BMC 320 improves information handling system 300 by detecting the failure of device 312, and isolating the device 312 such that the cooling fans are not run at 100%. In this embodiment, BMC 320 detecting the failure of device 312 prevents the high power consumption of the cooling fans within information handling system 300.

In an example, BMC 320 may detect, in any suitable manner, a failure of device 312. For example, if the OS of processor 322 cannot read the data from device 312 via the in-band communication channel, such that the data is not provided from the processor to BMC 320, and the BMC cannot communicate with the device via the out-of-band communication channel, the BMC may detect a failure of the device. In certain examples, BMC 320 may also detect failure of device 312 based on a power consumption of the device satisfying a threshold level. The power consumption of device 312 may be included in the data received from processor 322. In an example, BMC 320 may also detect failure of device 312 based on the cooling fans operating at 100% and the temperature, monitored via the out-of-band communication, of device 312 is still not dropping below a critical level. In response to detecting the failure of device 312, BMC 320 may perform one or more operations to isolate device 312.

In certain examples, the operations performed by BMC 320 may be any suitable operations to isolate device 312. For example, BMC 320 may instruct the OS of processor 322 to uninstall drivers of device 312. In an example, BMC 320 may cause power switch 310 to stop providing power to device 312, such that power to the device is switched off. In certain examples, BMC 320 may cause power switch 310 to stop providing power to device 312 in any suitable manner including, but not limited to, deasserting a power enable signal and asserting a power stop signal. In an example, BMC 320 may also provide a device reset signal to device 312. In response to BMC 320 performing these or any other suitable operations to isolate device 312, the BMC does not run the cooling fans at 100% and the amount of power consumed within information handling system 300 is not increased by the failure of the device. In an example, BMC 320 may monitor multiple devices within information handling system 300 and isolate failed devices on a one-by-one basis based on the operations described above.

In an example, upon BMC 320 isolating device 312, BMC 320 may provide a device removal indication to a system management component of information handling system 300. In response to the device removal indication, the system management component will notify an individual, in any suitable manner, that device 312 should be removed. In an example, the individual may be any person associated with information handling system 300 including, but not limited to, a technician and a user.

Figure 4:
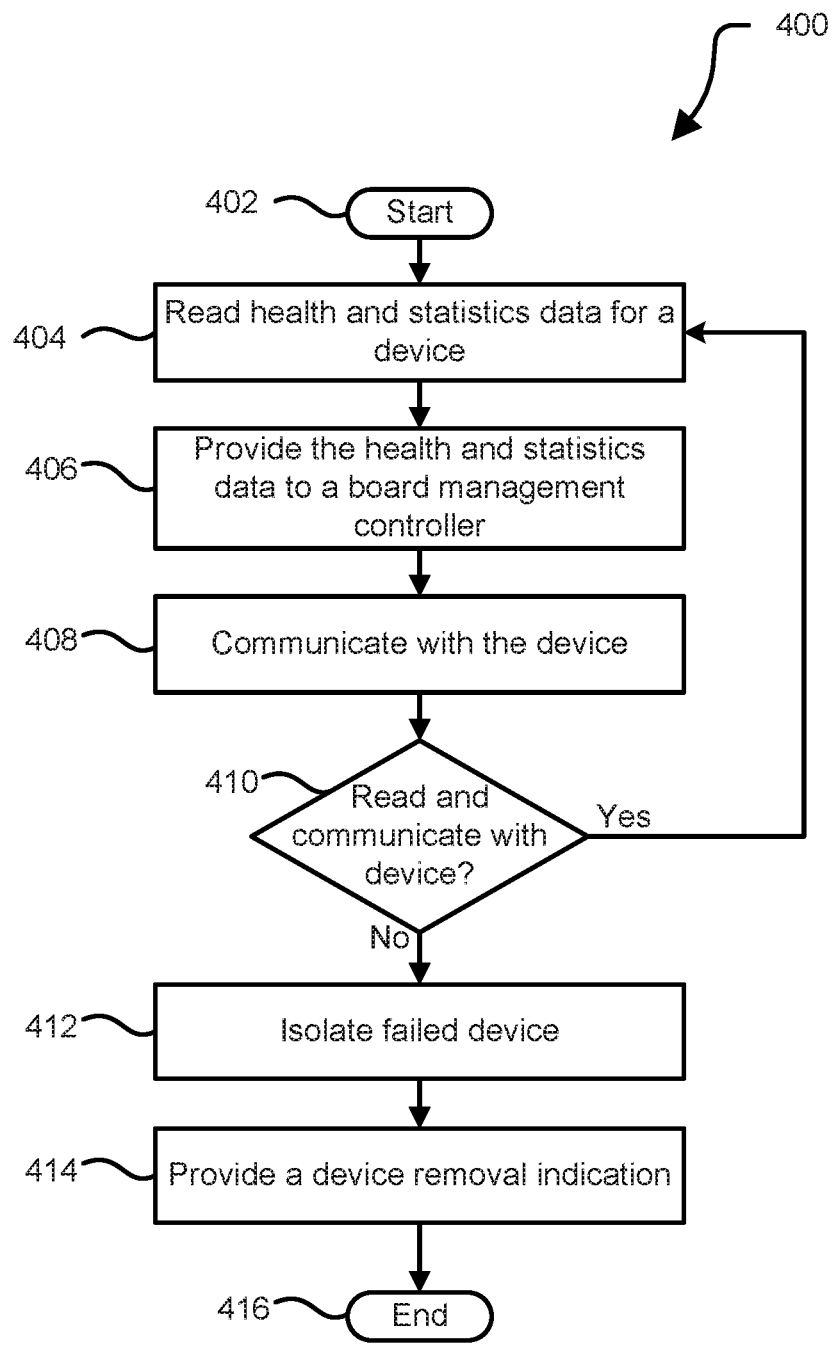
FIG. 4 is a flow diagram illustrating a method for isolating a failed device from an information handling system according to at least one embodiment of the disclosure.

FIG. 4 is a flow diagram illustrating a method 400 for isolating a failed device within an information handling system, starting at block 402. It will be readily appreciated that not every method step set forth in this flow diagram is always necessary, and that certain steps of the methods can be combined, performed simultaneously, in a different order, or perhaps omitted, without varying from the scope of the disclosure. At block 404, health data and statistics data for a device are read. For example, a processor of an information handling system may communicate with the device to retrieve different data associated with the device. In an embodiment, the communication between the processor and the device is through an in-band communication channel. In an example, an OS of the processor may communicate with the device over the in-band communication channel, such as a PCIe channel. In an example, the device type may be any suitable device type to be inserted within an information handling system including, but not limited to, a PCIe device, an FPGA device, a Gen-Z device, an OpenCAPI device, and CCIX device.

At block 406, the health and statistics data is provided to a board management controller. In an example, OS may also communicate the data to a board management controller (BMC) via an in-band communication channel, such as an Intelligent Platform Management Interface (IPMI). At block 408, the BMC communicates with the device. For example, the BMC may communicate with the device via an out-of-band communication channel, such as a SMBus. In an example, the BMC may monitor the temperature of the device via the out-of-band communication.

At block 410, a determination is made whether the health and statistics data may still be read via the in-band communication and whether the BMC still can communicate with the device via the out-of-band communication channel. If the health and statistics data is still able to be read and the BMC may continue to communicate with the device, the flow continues as stated above at block 404. If the health and statistics data is not able to be read and the BMC is not able to communicate with the device, the device is isolated at block 412. In an example, the device is isolated in any suitable manner including, but not limited to, drivers for the device being uninstalled, a device reset signal is asserted, and power to the device is disabled. At block 414, a device removal indication is provided. In response to the device removal indication, the system management component will notify an individual, in any suitable manner, that the device should be removed. The method ends in block 416.

Figure 5:
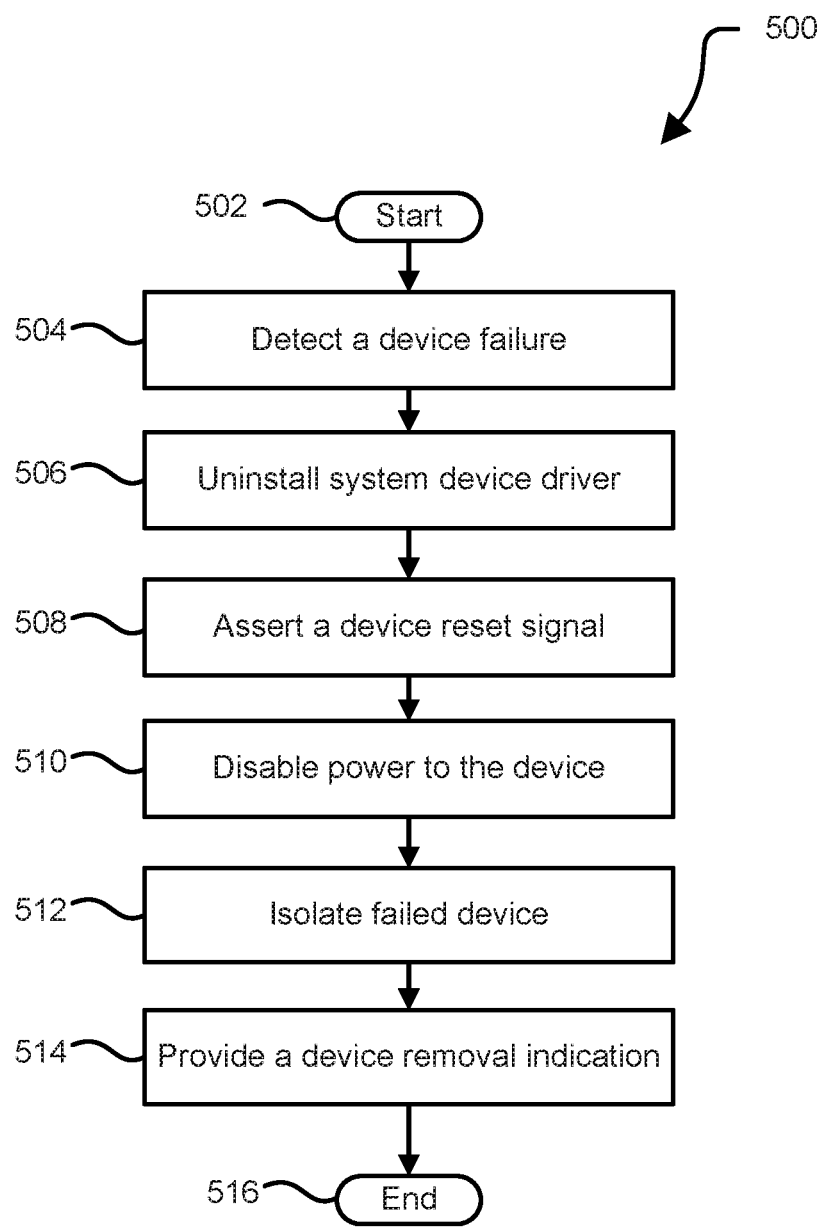
FIG. 5 is a flow diagram illustrating another method for isolating a failed device from an information handling system according to at least one embodiment of the disclosure.

FIG. 5 is a flow diagram illustrating a method 500 for isolating a failed device within an information handling system, starting at block 502. It will be readily appreciated that not every method step set forth in this flow diagram is always necessary, and that certain steps of the methods can be combined, performed simultaneously, in a different order, or perhaps omitted, without varying from the scope of the disclosure. At block 504, a device failure is detected. In an example, a failure of the device may be detected in response to health and statistics data of the device no longer being received via an in-band communication channel, and a BMC is no longer able to communicate with the device via an out-of-band communication channel. In an example, the in-band communication with the device may be via an OS of the processor. In an example, the device may be any suitable device to be inserted within an information handling system including, but not limited to, a PCIe device, an FPGA device, a Gen-Z device, an OpenCAPI device, and CCIX device.

At block 506, a system device driver is uninstalled. In an example, the BMC may cause the OS of a processor to uninstall the driver of the device. At block 508, a device reset signal is asserted. In an example, the BMC may provide the reset signal. At block 510, power to the device is disabled. In an example, BMC may cause a power switch to stop providing power to device in any suitable manner including, but not limited to, deasserting a power enable signal and asserting a power stop signal. At block 512, the failed device is isolated. At block 514, a device removal indication is provided. In an example, the device removal indication to a system management component of information handling system. In response to the device removal indication, the system management component will notify an individual, in any suitable manner, that the device should be removed. The method ends in block 516.

Figure 6:
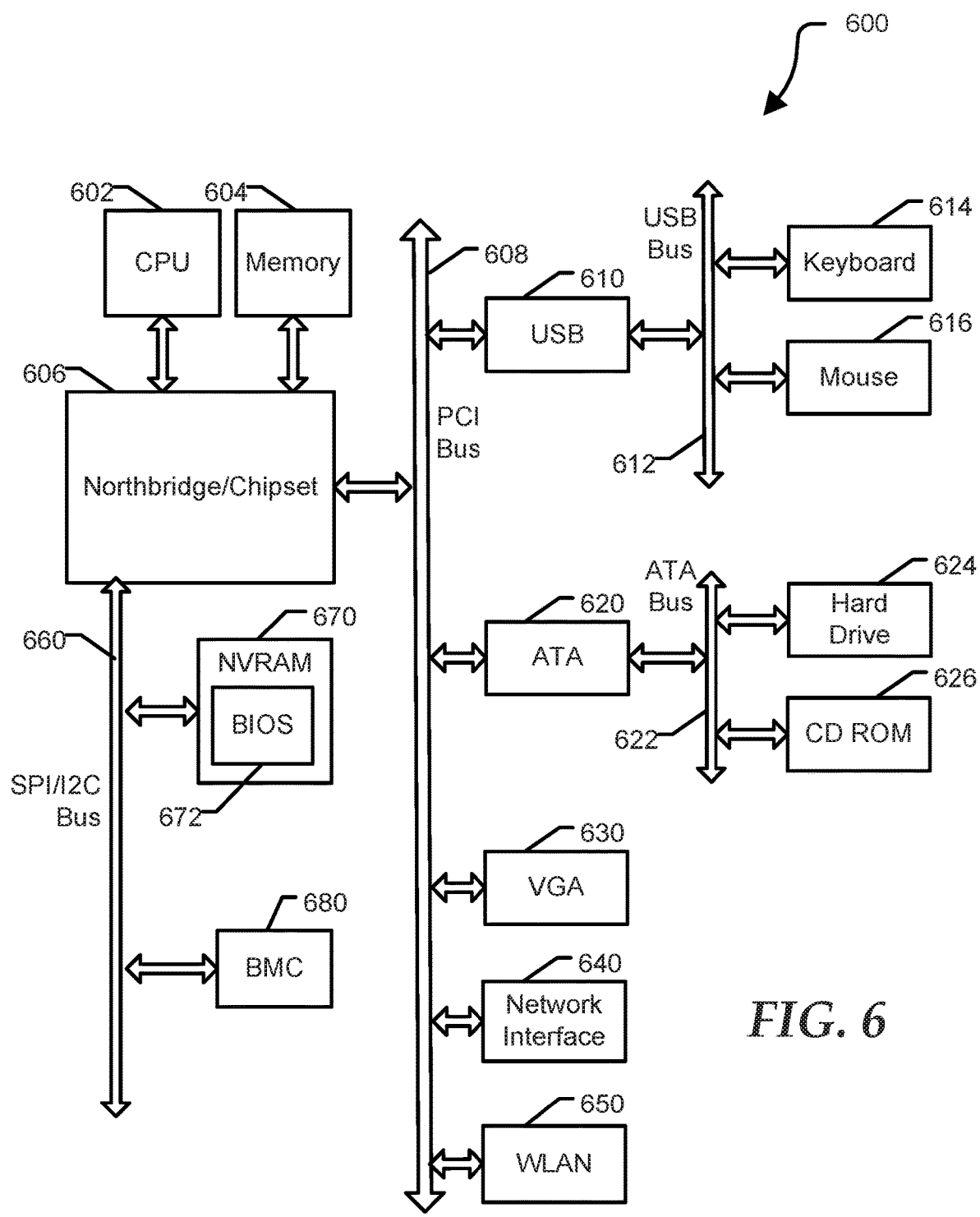
FIG. 6 is a block diagram of a general information handling system according to at least one embodiment of the disclosure.

FIG. 6 illustrates a general information handling system 600 including a processor 602, a memory 604, a northbridge/chipset 606, a PCI bus 608, a universal serial bus (USB) controller 610, a USB 612, a keyboard device controller 614, a mouse device controller 616, a configuration an ATA bus controller 620, an ATA bus 622, a hard drive device controller 624, a compact disk read only memory (CD ROM) device controller 626, a video graphics array (VGA) device controller 630, a network interface controller (NIC) 640, a wireless local area network (WLAN) controller 650, a serial peripheral interface (SPI) bus 660, a NVRAM 670 for storing BIOS 672, and a baseboard management controller (BMC) 680. In an embodiment, information handling system 600 may be information handling system 100 of FIG. 1 or information handling system 300 of FIG. 3. BMC 680 can be referred to as a service processor or embedded controller (EC). Capabilities and functions provided by BMC 680 can vary considerably based on the type of information handling system. For example, the term baseboard management system is often used to describe an embedded processor included at a server, while an embedded controller is more likely to be found in a consumer-level device. As disclosed herein, BMC 680 represents a processing device different from CPU 602, which provides various management functions for information handling system 600. For example, an embedded controller may be responsible for power management, cooling management, and the like. An embedded controller included at a data storage system can be referred to as a storage enclosure processor.

For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 600 can include processing resources for executing machine-executable code, such as CPU 602, a programmable logic array (PLA), an embedded device such as a System-on-a-Chip (SoC), or other control logic hardware. Information handling system 600 can also include one or more computer-readable medium for storing machine-executable code, such as software or data.

System 600 can include additional processors that are configured to provide localized or specific control functions, such as a battery management controller. Bus 660 can include one or more busses, including a SPI bus, an I2C bus, a system management bus (SMBUS), a power management bus (PMBUS), and the like. BMC 680 can be configured to provide out-of-band access to devices at information handling system 600. As used herein, out-of-band access herein refers to operations performed prior to execution of BIOS 672 by processor 602 to initialize operation of system 600.

BIOS 672 can be referred to as a firmware image, and the term BIOS is herein used interchangeably with the term firmware image, or simply firmware. BIOS 672 includes instructions executable by CPU 602 to initialize and test the hardware components of system 600, and to load a boot loader or an operating system (OS) from a mass storage device. BIOS 672 additionally provides an abstraction layer for the hardware, such as a consistent way for application programs and operating systems to interact with the keyboard, display, and other input/output devices. When power is first applied to information handling system 600, the system begins a sequence of initialization procedures. During the initialization sequence, also referred to as a boot sequence, components of system 600 are configured and enabled for operation, and device drivers can be installed. Device drivers provide an interface through which other components of the system 600 can communicate with a corresponding device.

Information handling system 600 can include additional components and additional busses, not shown for clarity. For example, system 600 can include multiple processor cores, audio devices, and the like. While a particular arrangement of bus technologies and interconnections is illustrated for the purpose of example, one of ordinary skill in the art will appreciate that the techniques disclosed herein are applicable to other system architectures. System 600 can include multiple CPUs and redundant bus controllers. One or more components can be integrated together. For example, portions of northbridge/chipset 606 can be integrated within CPU 602. Additional components of information handling system 600 can include one or more storage devices that can store machine-executable code, one or more communications ports for communicating with external devices, and various input and output (I/O) devices, such as a keyboard, a mouse, and a video display. For example, device controller 630 may provide data to a display device 690 to visually present the information to an individual associated with information handling system 600. An example of information handling system 600 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 600 can include a set of instructions that can be executed to cause the information handling system to perform any one or more of the methods or computer based functions disclosed herein. The information handling system 600 may operate as a standalone device or may be connected to other computer systems or peripheral devices, such as by a network.

In a networked deployment, the information handling system 600 may operate in the capacity of a server or as a client user computer in a server-client user network environment, or as a peer computer system in a peer-to-peer (or distributed) network environment. The information handling system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single information handling system 600 is illustrated, the term "system" shall also be taken to include any collection of systems or sub-systems that individually or jointly execute a set, or multiple sets, of instructions to perform one or more computer functions.

The information handling system 600 can include a disk drive unit and may include a computer-readable medium, not shown in FIG. 6, in which one or more sets of instructions, such as software, can be embedded. Further, the instructions may embody one or more of the methods or logic as described herein. In a particular embodiment, the instructions may reside completely, or at least partially, within system memory 604 or another memory included at system 600, and/or within the processor 602 during execution by the information handling system 600. The system memory 604 and the processor 602 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
    a device configured to communicate with a processor of the information handling system; and
    a baseboard management controller to communicate with the device via an in-band communication channel, the baseboard management controller to:
        determine whether data is received from the device via an in-band communication channel;
        in response to the data not being received, provide a control signal to cooling fans of the information handling system, the control signal to cause the cooling fans to run at a maximum speed;
        determine whether the baseboard management controller may communicate with the device via an out-of-band communication channel; and
        in response to the data not being received and the baseboard management controller not able to communicate with the device, detect a failure of the device; and
        in response to the detection of the failure of the device, isolate the device and reduce the cooling fans to run at a speed below the maximum speed.

2. The information handling system of claim 1, wherein in response to the detection of the failure of the device, the baseboard management controller is further configured to cause the processor to uninstall a driver of the device.

3. The information handling system of claim 1, further comprising:
    a power switch to provide auxiliary power to the device.

4. The information handling system of claim 3, wherein in response to the detection of the failure of the device, the baseboard management controller is further configured to switch off the auxiliary power provided from the power switch to the device.

5. The information handling system of claim 1, wherein in response to the detection of the failure of the device, the baseboard management controller is further configured to assert a reset signal to the device.

6. The information handling system of claim 1, wherein an operating system of the processor is configured to continuously receive the data from the device and periodically provide the data to the baseboard management controller.

7. The information handling system of claim 1, wherein the data is health and statistic data of the device.

8. A method, comprising: determining whether data is received from a device via an in-band communication channel; in response to the data not being received, providing a control signal to cooling fans of an information handling system, the control signal to cause the cooling fans to run at a maximum speed: determining where a baseboard management controller may communicate with the device via an out-of-band communication channel; in response to the data not being received and the baseboard management controller not able to communicate with the device, detecting a failure of the device; and in response to the detection of the failure of the device, isolating the device and reducing the cooling fans to run at a speed below the maximum speed.

9. The method of claim 8, further comprising:
    in response to the detection of the failure of the device, causing the processor to uninstall a driver of the device.

10. The method of claim 8, further comprising:
    providing, via a power switch, auxiliary power to the device.

11. The method of claim 10, further comprising:
    in response to the detection of the failure of the device, switching off the auxiliary power to the device.

12. The method of claim 8, further comprising:
    in response to the detection of the failure of the device, asserting a reset signal to the device.

13. The method of claim 8, further comprising:
    continuously receiving, via an operating system of the processor, the data from the device; and
    periodically providing the data to the baseboard management controller.

14. The method of claim 8, wherein the data is health and statistic data of the device.

15. A method, comprising:
   continuously receiving, via an operating system of a processor, data from a device;
   determining whether the data is received from the device via an in-band communication channel;
   in response to the data not being received, providing a control signal to cooling fans of an information handling system, the control signal to cause the cooling fans to run at a maximum speed;
   determining whether a baseboard management controller may communicate with the device via an out-of-band communication channel;
   in response to the data not being received and the baseboard management controller not able to communicate with the device, detecting a failure of the device; and
   in response to the detection of the failure of the device, isolating the device and reducing the cooling fans to run at a speed below the maximum speed.

16. The method of claim 15, further comprising:
   in response to the detection of the failure of the device, causing the processor to uninstall a driver of the device.

17. The method of claim 15, further comprising:
   providing, via a power switch, auxiliary power to the device.

18. The method of claim 17, further comprising:
   in response to the detection of the failure of the device, switching off the auxiliary power to the device.

19. The method of claim 18, further comprising:
   in response to the detection of the failure of the device, asserting a reset signal to the device.

20. The method of claim 15, wherein the data is health and statistic data of the device.

\* \* \* \* \*